United States Patent [19]
Cheok et al.

[11] Patent Number: 5,746,353
[45] Date of Patent: May 5, 1998

[54] PORTABLE LAUNDRY DETERGENT DISPENSING SYSTEM

[76] Inventors: Calvin Kok-Hwa Cheok, 3840 Far West Blvd. #321, Austin, Tex. 78731; Rajesh Jaigopai Saggi, 20 Jaffray Park, Irvington, N.Y. 10533

[21] Appl. No.: 670,048

[22] Filed: Jun. 25, 1996

[51] Int. Cl.⁶ .................................................. A47F 3/02
[52] U.S. Cl. .................. 222/132; 222/135; 222/138; 222/175; 222/192; 222/321.7; 222/368; 222/533
[58] Field of Search ............................ 222/132, 135, 222/138, 175, 192, 321.1, 321.7, 533, 368

[56] References Cited

U.S. PATENT DOCUMENTS

| | | | |
|---|---|---|---|
| 731,454 | 6/1903 | Higgins | 222/533 |
| 2,802,599 | 8/1957 | Calahan et al. | 222/135 |
| 3,221,861 | 12/1965 | Maxwell | 222/132 |
| 3,349,967 | 10/1967 | Schneller | 222/132 |
| 3,653,549 | 4/1972 | Cannon | 222/132 |
| 3,850,347 | 11/1974 | Hill | 222/368 |
| 4,153,184 | 5/1979 | Parish et al. | 222/175 |
| 4,869,402 | 9/1989 | Ash, Jr. | 222/175 |
| 5,044,522 | 9/1991 | Roig et al. | 222/132 |
| 5,052,288 | 10/1991 | Marquez et al. | 222/368 |
| 5,065,905 | 11/1991 | Eddy et al. | 222/132 |
| 5,193,670 | 3/1993 | Fong | 222/192 |
| 5,323,938 | 6/1994 | Ceccarelli et al. | 222/442 |
| 5,529,220 | 6/1996 | Credle, Jr. et al. | 222/175 |

*Primary Examiner*—J. Casimer Jacyna
*Attorney, Agent, or Firm*—Richard T. Holzmann

[57] ABSTRACT

The present invention relates in general to a portable laundry detergent dispensing system. This unit is divided into three holding containers, one for liquid detergent, one for powdered detergent and one for liquid fabric softener. The center back compartment is a storage compartment for a measuring cup, a mixing rod and other laundry accessories. The storage compartment also includes a coin-holder for nickles, dimes and quarters in the rear wall. The powder dispenser is a cylindrical dump cup having an opening therein which allows a fixed amount of the the solid detergent to flow into a measuring cup. Liquid detergents and softeners are dispensed with a fixed volume hand pump assembly connected to retractable hose assemblies.

5 Claims, 8 Drawing Sheets

PORTABLE LAUNDRY DETERGENT DISPENSING SYSTEM

This invention has been preliminarily described in Disclosure Document No. 372076, whose date is Mar. 13, 1995.

FIELD OF THE INVENTION

The present invention relates in general to a portable laundry detergent dispensing system.

BACKGROUND OF THE INVENTION

As a result of societal changes in recent years, there is an ever-increasing demand for the service of a Laundromat™ and similar enterprises, that is, a commercial laundry having coin-operated, automatic machines for the washing and drying of clothes, linens and the like. This demand has, in turn, created an additional demand for a portable article of manufacture which allows a user of such service to easily transport the necessary detergents, fabric softeners and the like to and from the location of this type of commercial laundry.

There are some conventional products which may be used for this purpose, but these have need for changes to more properly reflect the current requirements for such portable laundry detergent dispensing systems. U.S. Pat. No. 5,193,670 issued to Fong, for example, describes a portable, two-compartment system for storing and pouring liquid cleaning products. Such article, however, has no means for handling a powdered cleaning product which may be the detergent of choice in many washing applications. Furthermore, the spouts for pouring the liquids are such that they produce much dripping and wastage of expensive detergent. In addition, there is no provision for the storage and handling of fabric softeners which are widely used in most washing machines today in order to provide a desirable hand to the finished dried fabric.

Copeland et al in U.S. Pat. No. 5,033,649 disclose a relatively portable dispensing container which combines multiple components for storing and dispensing mixed solutions. This system is designed for janitorial settings which require a significant amount and number of specialized cleaning solutions which are prepared from purchased concentrates and which are diluted on site to the proper strength to be used. Such systems are far too complex for the problem at hand, having need for not only a container for the concentrated cleaning product and an intermediate sized storage container for the diluted cleaning product, but also a method to dose concentrate into the storage container and a water supply line to dilute the concentrate.

Other devices for selectively dispensing liquids adapted to be operated in conjunction with a shower fixture have been disclosed in U.S. Pat. No. 3,720,352 issued to Kozlowski and U.S. Pat. No. 5,044,522 issued to Roig et al. These too have not been designed to handle powders nor are they especially suited for easy portability, however, they do embody the principle of dispensing liquid soaps, shampoos and the like.

SUMMARY OF THE INVENTION

It is, therefore, an object of the present invention to provide a portable laundry detergent dispensing system in which the aforementioned problems can be overcome and which can dispense powdered detergent in addition to liquid, and which has a provision for dispensing fabric softener as well. Furthermore, provision is made to carry coins and other accessories necessary when using a commercial laundry.

A portable laundry detergent dispensing system comprising: a light weight case having a removable cover and bottom and having internal walls and floors for supporting separate containers holding liquid and powder detergents and fabric softeners and having a portion of available space therein for holding a money change holder and for storing other items; a solid dispensing means for dispensing precise quantities of solid connected to the case and said powder detergent container through a cylindrical dump cup supported by a dump cup housing affixed to case and in supporting contact to said powder detergent container; and a pump assembly means for dispensing precise quantities of liquid connected to the front of the case and to the liquid containers through flexible plastic tubing.

In order to accomplish the above objective, this unit is divided into three holding containers, one for liquid detergent, one for powdered detergent and one for liquid fabric softener. The center back compartment is a storage compartment for a measuring cup, a mixing rod and other laundry accessories. The storage compartment also includes a coin-holder for nickles, dimes and quarters in the rear wall. The powder dispenser is a cylindrical dump cup having an opening therein which allows a fixed amount of the the solid detergent to flow into a measuring cup. Liquid detergents and softeners are dispensed with a fixed volume hand pump assembly connected to retractable hose assemblies.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
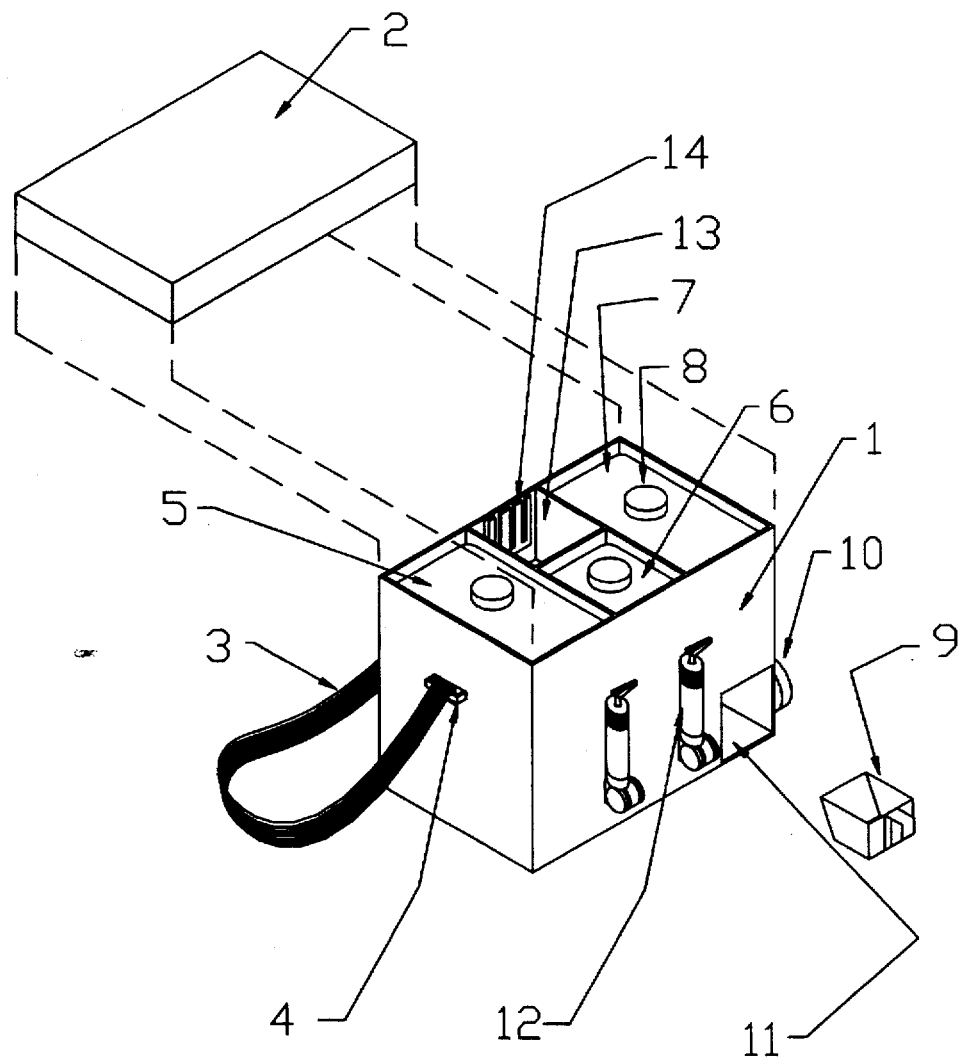
FIG. 1 shows a perspective view of the assembled portable laundry detergent dispensing system in accordance with an embodiment of the present invention.

With reference to the accompanying drawings, FIG. 1 of the present invention is a perspective view of an assembled portable laundry detergent dispensing system having a plastic light weight case 1 with retractable assemblies inside and a plastic cover 2. The case is provided with a flexible shoulder strap 3 made of any suitable fabric, plastic or leather material attached to the outside of case 1 by loops 4. Within case 1 and separated by walls and floors are three dispensing containers, chemically treated for resisting the caustic action of detergents, the one for liquid detergent 5, a second for liquid fabric softener 6 and a third for powder detergent 7 each having screw caps 8 on their respective tops for loading of their contents and preventing spillage in handling. The two liquid containing containers are each provided with a hand pump assembly 12 connected to retractable flexible plastic tubing 19 (see FIG. 2) of a few feet in length for dispensing the liquid. It may be noted that a typical pistol-grip type pump proved unsuitable for this application due to the viscosity of the liquids involved. At the base of the powder detergent dispensing container 7 can be found a dump cup assembly 10 having as an element thereof a cylindrical dump cup 17 (see FIG. 2) which has an opening therein for the loading and unloading thereof, said dump cup 17 having as an integral part thereof a handle for rotation of the cup to dispense the contents into a removable measuring cup 9 the case 1 having a receptacle 11 for receiving said measuring cup 9. To the rear of the softener container 6 is a storage space 13 made available for holding the measuring cup 9 when not in use, a plastic stirring rod (not shown) for breaking up any lumps in the powder detergent, and other items the user cares to carry. In addition, affixed to the inside rear wall of case 1 is a money change holder 14 for nickles, dimes and quarters, the coinage normally required in a commercial Laundromat™.

Figure 2:
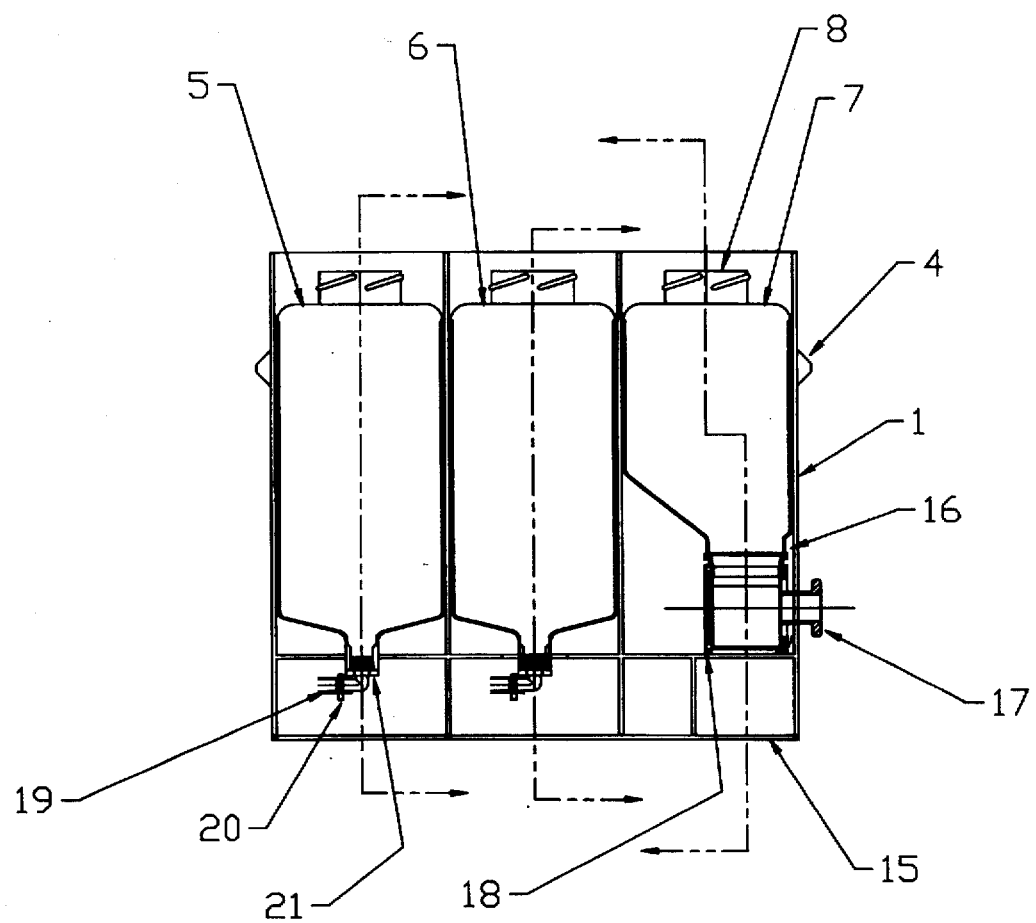
FIG. 2 is a cross sectional view of the complete unit of the present invention.

Turning to FIG. 2, a cross sectional view of the unit, one finds the two loops 4 for holding the strap 3, a case bottom 15 which is screwed to case 1 for ease of assembly and maintenance, a cylindrical dump cup support housing 16 is shown, as well as a wave spring 18 for maintaining the dump cup 17 in a snug position. In this view, the liquid dispensing containers reveal flexible plastic tubing 19 fitted through a snap grip hose and tube clamp 20 to a threaded tube elbow 21.

Figure 3:
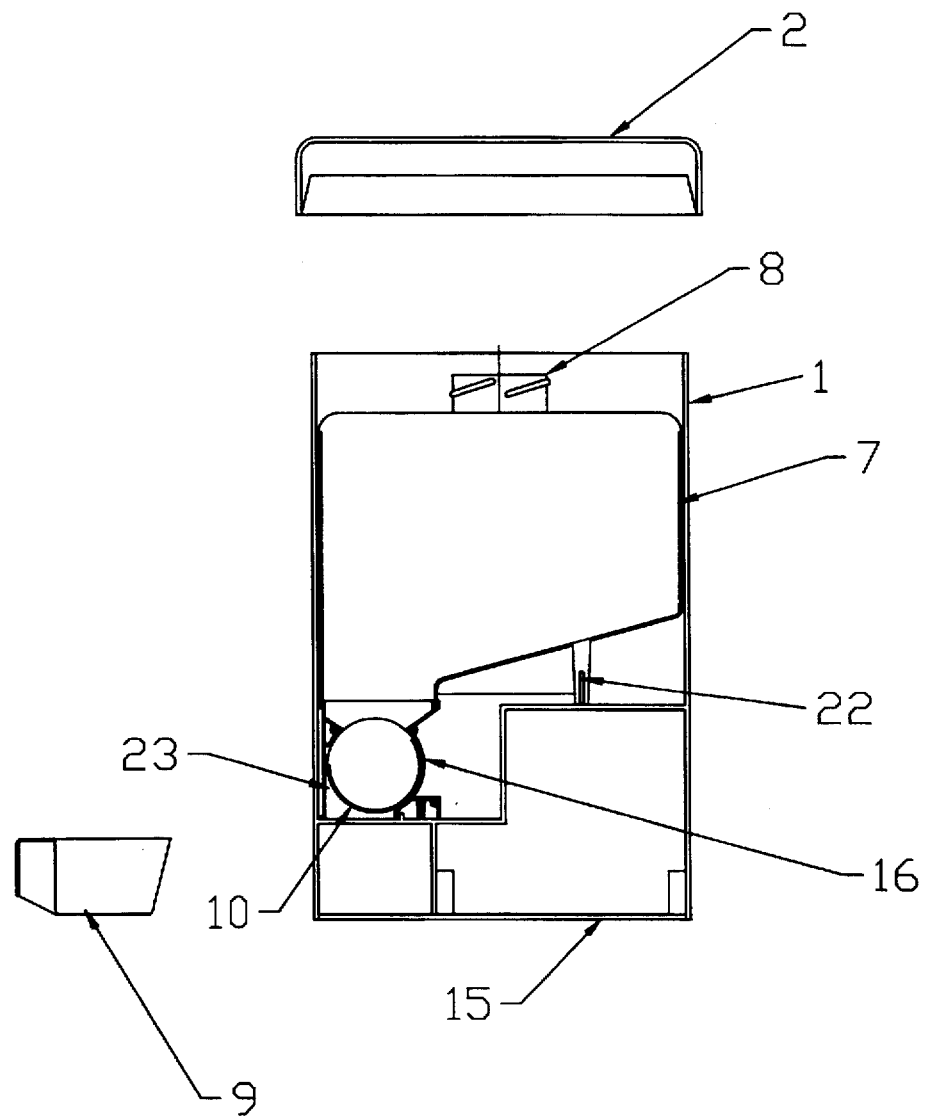
FIG. 3 is a cross sectional view of the powder detergent dispensing sub-system of the present invention.
Figure 4:
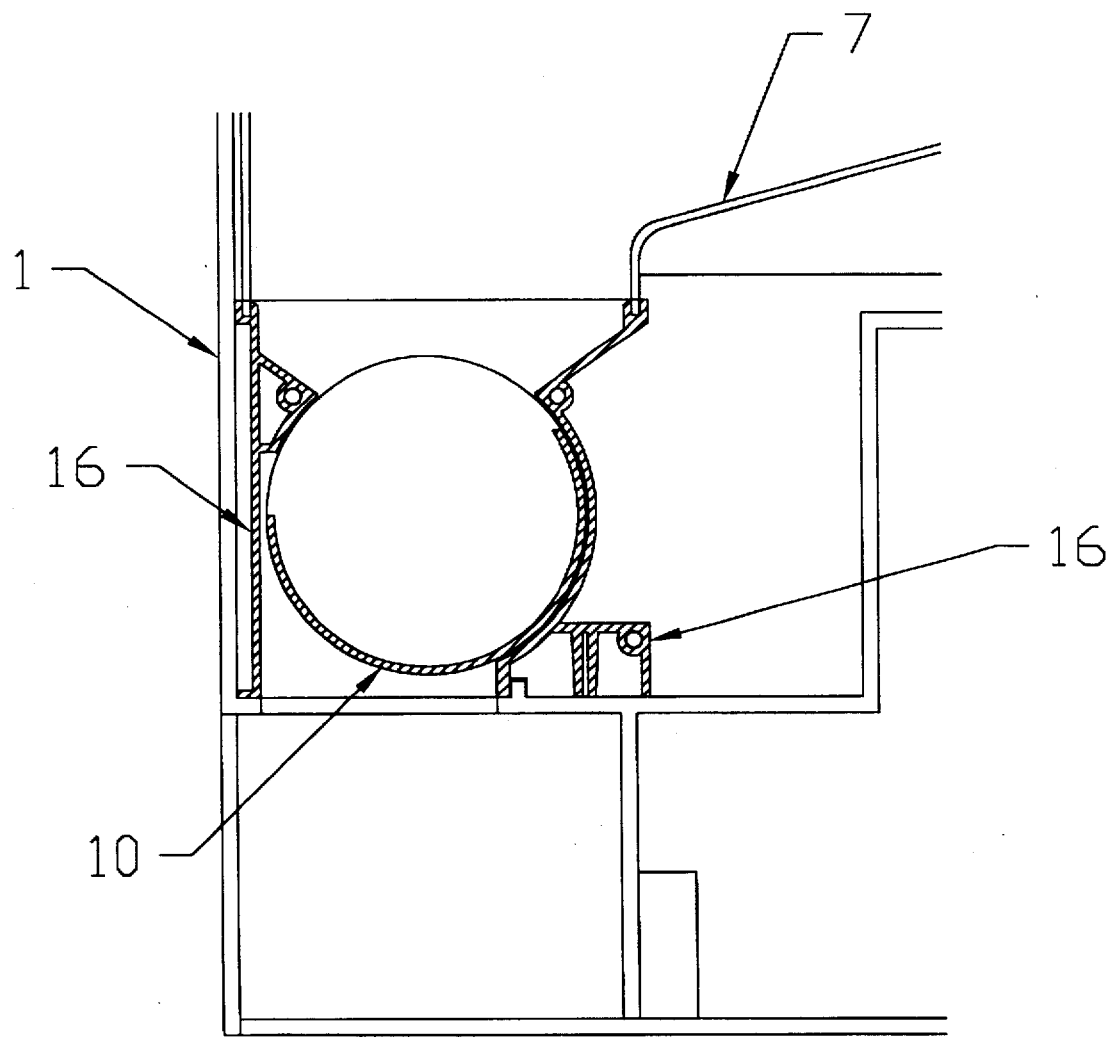
FIG. 4 is a cross sectional side view of the powder dumping assembly of the present invention.
Figure 5:
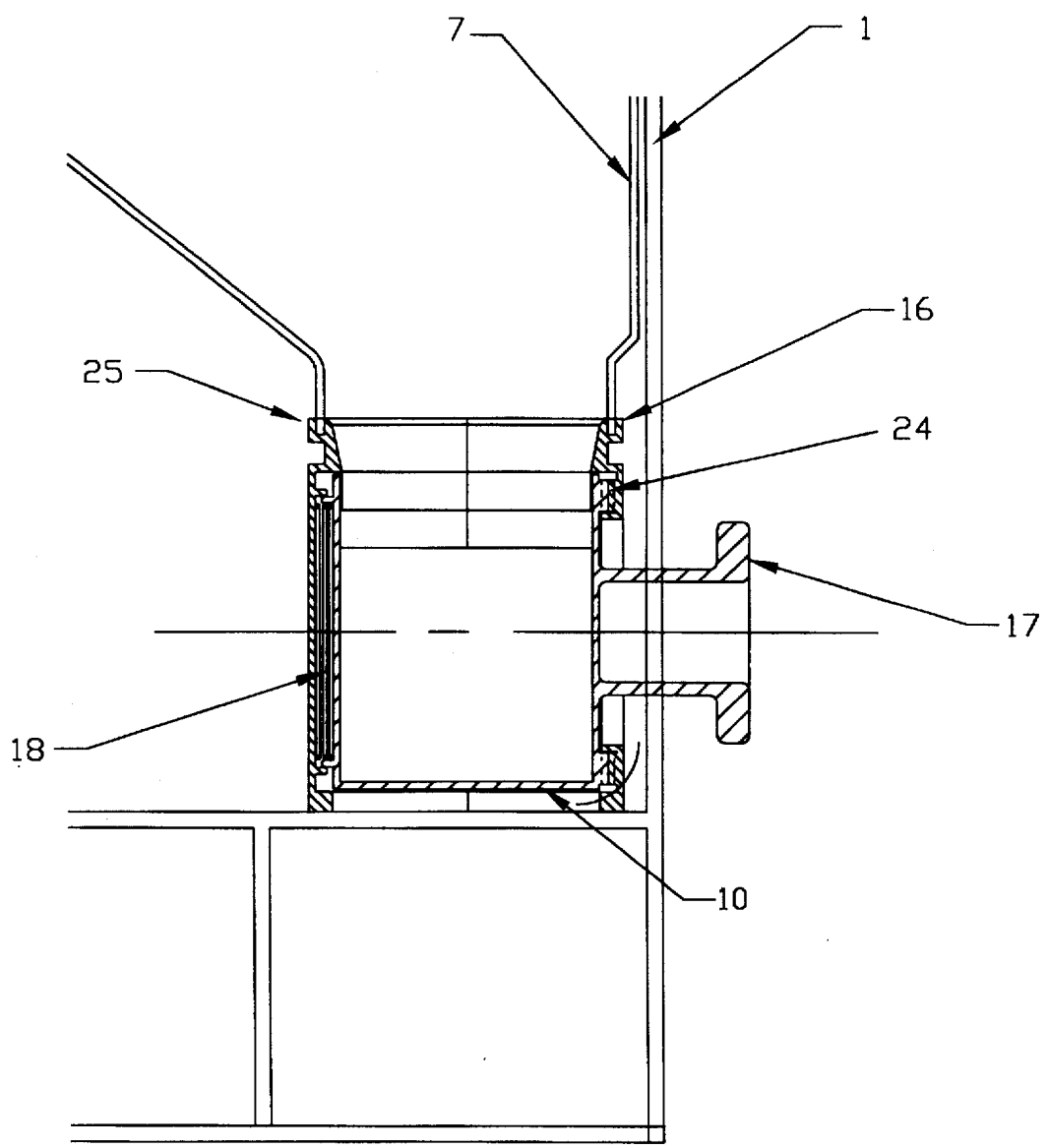
FIG. 5 is a cross sectional front view of the powder dumping assembly of the present invention.

FIG. 3 illustrates a cross sectional view of the powder detergent dispensing unit showing a screw mount 22 for supporting the plastic container, below which is dead space which could be fitted with a door for extra storage area if desired, and a powder dumping area 23. FIG. 4 shows a more detailed view of the powder dumping assembly 10 especially the powder dump cup housing 16 which consists of two parts screwed together, itself screwed into place in the supporting floor portion. FIG. 5 illustrates more clearly in a cross sectional front view the operation of the powder dumping assembly 10 showing the cylindrical dump cup 17 having an integral handle which rotates dump cup 17, a wave spring 18 for maintaining a snug fit of dump cup 17, ratchet teeth 24 allowing the cup to move in a clockwise direction only, and having a receiving channel 25 for connecting dump cup assembly 10 to powder detergent container 6.

Figure 6:
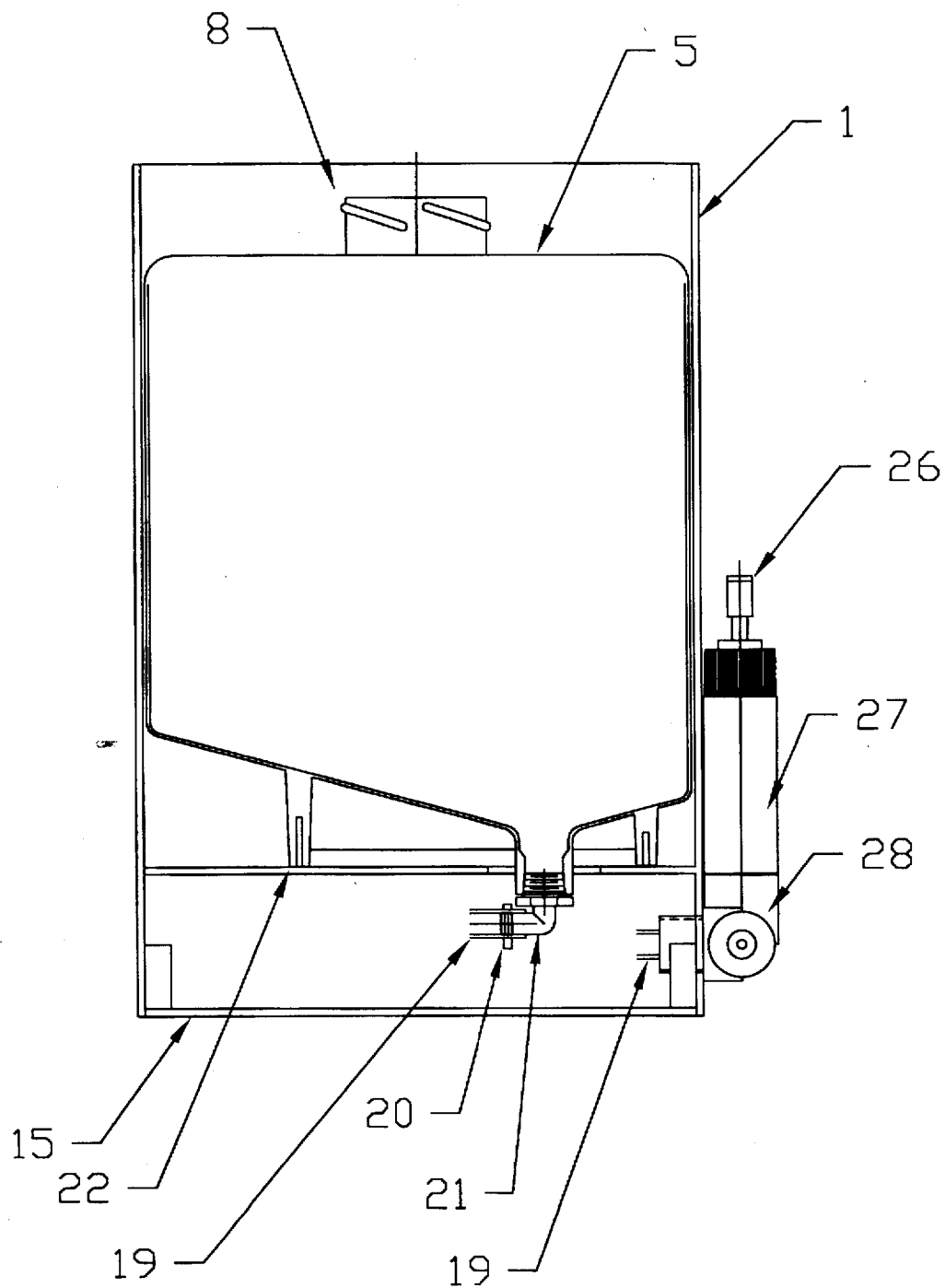
FIG. 6 is a cross sectional view of the liquid detergent dispensing sub-system of the present invention.
Figure 7:
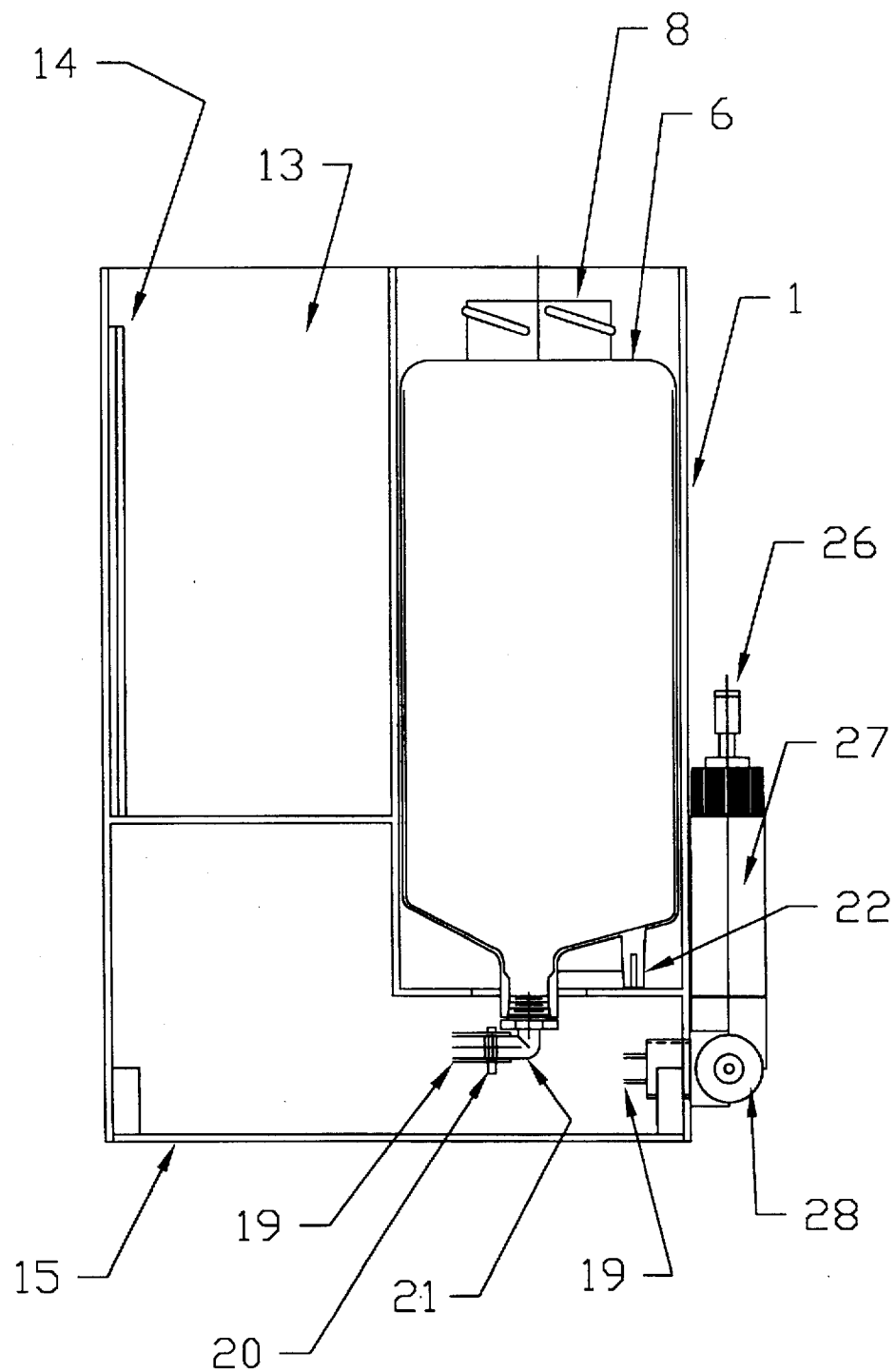
FIG. 7 is a cross sectional view of the fabric softener dispensing sub-system of the present invention.

In FIG. 6 of a cross section of the liquid detergent container 5 is shown the structure and operation of the hand pump assembly 12 comprising a 1 ounce liquid pump 26, of a type similar to a hand lotion pump available, for example, from U.S. Plastics of Lima, Ohio, fitted into a pump chamber 27 and attached to hinge assembly 28 which hand pump assembly 12 is attached to the front wall of case 1 and is connected to flexible plastic tubing 19 which in turn is connected to the liquid container 5. FIG. 7 in a cross sectional view of the fabric softener container 6 illustrates more clearly the position of the money change holder 14 in the cup and mixing rod (not shown) storage area 13.

Figure 8:
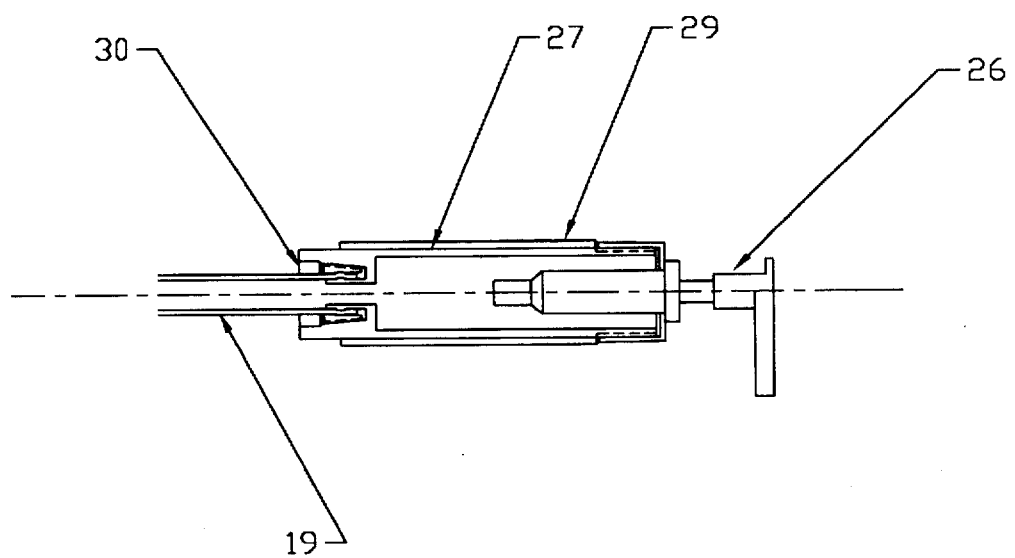
FIG. 8 is a cross sectional view of the pump unit of the present invention.

The cross sectional view of a pump unit in FIG. 8 shows the liquid pump itself 26 inserted into the pump chamber 27 which also acts as a handle for the pump assembly, said handle portion having a soft rubber cover 29 providing non-slip capability, the flexible plastic tubing 19 having, for example, a durometer hardness of shore A, 55, fitted into the pump assembly 12 by a tubing retaining nut 30 being threaded on the outside which can be pinch fit to tubing 19.

One of the major advantages of the present system is the ability to carry liquid softener and solid detergent, normally unavailable in conventional portable laundry systems. Another benefit is the ability to dispense consistent and relatively precise quantities of these liquids and solid ingredients. Furthermore, spillage and sloppiness are usually associated with this type of device, but the dispensing elements easily lend themselves to a clean operation. Finally, the simplicity of construction lends itself to ease of assembly, disassembly and, therefore, maintenance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable laundry detergent dispensing system comprising:

a light weight case having a bottom, at least one side wall, internal walls, a floor and a removable cover;

a space for storing items provided within said case, said space including a means for holding coins;

a container adapter for liquid detergents supported within said case;

a container adapter for holding liquid fabric softeners supported within said case;

a container adapted for holding powder detergents supported within said case;

a solid dispensing means connected to the case for dispensing precise quantities of powder, said solid dispensing means including a dump cup housing affixed to the case and in supporting contact said container adapted for holding power, and a cylindrical dump cup supported by said dump cup housing;

a pair of pump assembly means connected to one side at least one side wall of said case for dispensing precise quantities of liquid, a one of said pair of pump assembly means connected to said container adapted for holding liquid detergents, and the other of said pair of pump assembly means connected to said container adapter for holding liquid fabric softeners; and flexible plastic tubing for connection each one of said pair of pump assembly means to each of said containers adapted for holding liquids.

2. The laundry detergent dispensing system in accordance with claim 1, said case further comprising loops attached to the outside walls of the case to hold a strap for carrying the case, the case having a receptacle area adapted for receiving a measuring cup used for collection of dispensed powder detergent from said container.

3. The laundry detergent dispensing system in accordance with claim 1 wherein said cylindrical dump cup having a handle as an integral portion thereof and having an opening therein for receiving and discharging powder detergent into the measuring cup upon rotation of said handle, the housing further comprising ratchet teeth allowing said dump cup to be moved in a clockwise direction only and a wave spring inserted between the dump cup housing and said dump cup to maintain a snug fit of the solid dispensing means, the dump cup housing further having therein a receiving channel for receiving and supporting a bottom of said powder detergent container and further providing a powder dumping area to allow flow of the powder from said dump cup to a measuring cup.

4. The laundry detergent dispensing system in accordance with claim 1, said pair pump assembly means further comprising a liquid pump inserted into a pump chamber, said chamber having a soft rubber cover for ease of handling, which combination is attached to one end a hinge assembly, said hinge assembly having its other end attached by a tubing retaining nut to the flexible plastic tubing which in turn is attached to said liquid containers through a snap grip hose and a tube clamp and a threaded tube elbow.

5. The laundry detergent dispensing system, in accordance with claim 1, said containers further comprising screw caps on their respective tops for loading of their contents and to prevent spillage in handling, and screw mounts for supporting the bottoms of said containers.

* * * * *